March 19, 1957  K. C. SIMPSON  2,785,499
FISHING BOBBER
Filed Sept. 21, 1953
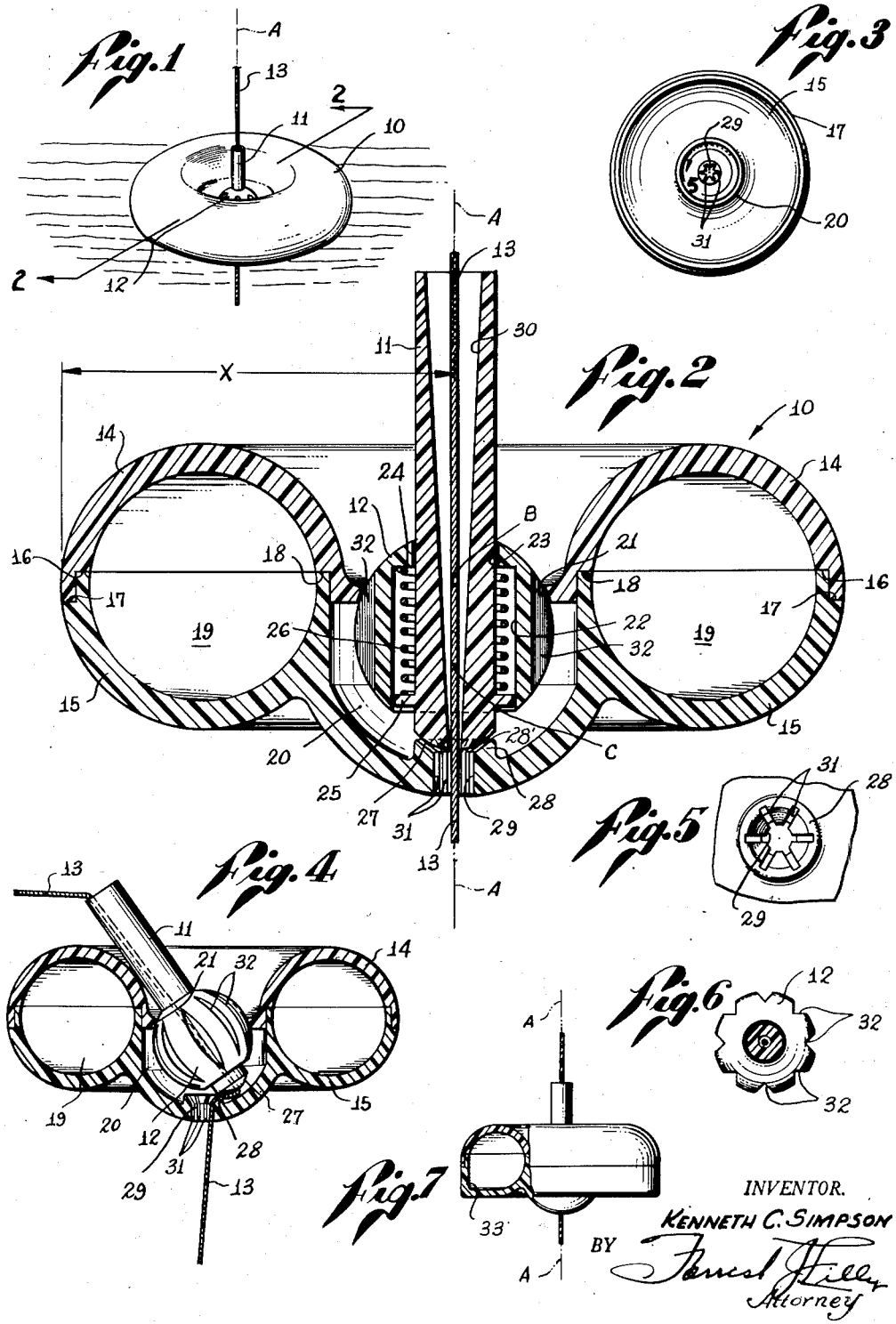
INVENTOR.
KENNETH C. SIMPSON
BY
Attorney

United States Patent Office 2,785,499
Patented Mar. 19, 1957

2,785,499

FISHING BOBBER

Kenneth C. Simpson, Pasadena, Calif.

Application September 21, 1953, Serial No. 381,283

15 Claims. (Cl. 43—44.88)

This invention relates to fishing bobbers or floats and more particularly to an improved bobber of the type that is free to move along the fishing line to a desired position and then be secured to the line by a sudden jerk on the same.

In one form of angling, it is usual to attach a baited hook, a weight, and a bobber to the fishing line at a fixed position therealong. The distance on the fishing line from the baited hook to the fixed bobber is usually too great to permit the angler to cast the line with a modern short casting rod equipped with a line reel. Further, when the bobber is fixedly attached to the line, the length of line between the fixed bobber and hook may prevent reeling the fish in close enough to the end of the pole to make easy the landing operation. Also, the bobber will offer some resistance when the line is drawn through the water to pull the fish in and this resistance, in addition to the pull of the fish, may interfere with proper playing of the fish.

It is desirable, therefore, not only to have a bobber which may be positioned adjacent to the sinker or hook for the cast and which can be secured in a desired position on the line at the will of the fisherman after the cast is made, but also to have the bobber loose on the line after the fish has taken the bait.

A preferred form of bobber of this class is described and claimed in my United States Patent No. 2,609,634, issued September 9, 1952. Briefly, bobbers of this type incorporate a clutch means through which the fishing line may freely run when in a normal position. The clutch is such that a sudden jerk on the line will bind the fishing line in a manner to fix the bobber thereto. When the line is pulled from both ends, as can be effected after a fish has been caught by a pull on the fishing pole or rapid winding of the reel, the clutch is thrown back into normal position to free the bobber. The clutching action is attained by a tubular stem extending vertically upwardly from the bobber and through which the line passes, the stem being mounted on a universal joint within the bobber and having its tubular bore in alignment with a passage through the bottom of the bobber. Tilting of the stem by a jerk on the line will move the stem bore out of alignment with the passage and thus bind the line.

To be effective, it is extremely important that the bobber float with the stem axis be substantially vertical and that in such a position the bobber be as stable as possible in order that jerking of the line will tilt the stem. Prior bobbers are all generally elongated in a vertical direction with rounded or pointed bottoms which make them subject to easy roll when floating. Thus, when the line is jerked, the bobber tends merely to be bodily rotated and the stem and clutch members are not affected.

The present invention has as its primary object the provision of a vastly improved bobber of the character described, incorporating novel buoyant properties resulting in a bobber which is highly stable in its normal floating position whereby jerking of the line to operate the clutch mechanism is rendered far more reliable, and the possibility of rotation of the bobber about a horizontal axis is substantially eliminated.

It is also important in bobbers of the above type that the line shall not bind so tightly in the clutch mechanism as to render it impossible to tilt the clutch stem by jerks on the line.

Another object of the present invention, accordingly, is to provide an improved bobber incorporating a clutch mechanism in which the possibility of the line binding too tightly is materially reduced.

Further objects and advantages of the improved bobber of this invention will be apparent on referring to the following description of a preferred embodiment thereof taken in conjunction with the accompanying drawings in which:

Figure 1 is a perspective view of a preferred embodiment of the bobber with the parts shown in the unlocked position;

Figure 2 is an enlarged sectional view of the bobber taken substantially along line 2—2 in Fig. 1;

Figure 3 is a plan view of the lower section of the bobber;

Figure 4 is a sectional view similar to Fig. 2 but on a reduced scale with the ball shown complete and the parts in the line locking position;

Figure 5 is an enlarged view of that portion of the bobber enclosed in the circle 5 of Figure 3;

Figure 6 is a detail plan view partly in section of part of the clutch mechanism of the bobber; and Figure 7 is an elevational view of a modified form of the bobber with a part thereof broken away.

Referring now to Figure 1, the bobber is designated generally by the numeral 10 and as shown comprises a generally toroidal shaped float member. This shape of the float is an extremely important feature of the present invention in that it results in high floating stability. The shape is such that the diameter of the toroidal body is greater than the maximum dimension of the bobber in the direction of the axis of the toroid. This axis is designated A in Figure 1 and as shown is directed vertically. The bobber will thus float with great stability in view of this flattened configuration and its axis will normally remain vertical.

Vertically extending from the central portion of the float member is a tubular stem 11 mounted on a universal joint, which in the illustrated embodiment, takes the form of a ball 12. A fishing line 13 passes through aligned bores in the stem and the lower portion of the float member as will become clear as the description proceeds. In the normal position of the stem as shown in Figures 1 and 2 the fishing line 13 is free to move through the bobber. When the line is given a sudden jerk to tilt the stem as shown in Figure 4, the line will bind in the clutch mechanism of the bobber to lock the bobber to the line. The desirability of vertical stability in the bobber is thus immediately evident, since if the bobber were of elongated shape in the vertical direction, jerking of the line would tend to simply roll the bobber in the water and the assurance of proper tilting of the stem would be greatly reduced. Owing to the toroidal shape of the float as shown in Figure 1 the bobber has greater horizontal than vertical dimension which insures the required buoyant stability.

Referring now to the enlarged detailed cross section in Figure 2, the preferred form of the float member is shown as made up of an upper section 14 and lower section 15, said sections being preferably formed of a plastic material. Each section is of a circular configuration in plan view and defines an annular channel. The edges of the channel of section 14 are undercut as at 16 and 18 and the outer edge of the channel of section 15 is cut to provide a mating shoulder 17. Thus, the sections may be mated together as shown to form a water-tight enclosure, the annular channels defining an annular hollow chamber 19 of toroidal shape when the sections are thus assembled.

The maximum diameter of the bobber, that is twice its radial extent indicated by X in Fig. 2, is substantially greater than the maximum vertical dimension of the bobber, including the stem, in the direction of the axis A, lending considerable stability to the bobber.

To further increase stability, the central portion of the lower section 15 is provided with a depending substantially hemispherical wall portion forming the bottom wall of a chamber 20, which chamber is adapted to receive water and thus weight the lower central portion of the bobber. The center of gravity of the water filling this chamber will be approximately at C and it will be noted that it is lower than the center of buoyancy B of the annular chamber 19.

A circular opening 21 is provided in the central portion of the upper section 14 communicating with the chamber 20. Within the chamber 20 there is provided a ball 12 having a diameter greater than the diameter of the opening 21 whereby it may seat against this opening as shown. Ball 12 is provided with a diametrical bore 22 terminating at the upper end of the ball in a reduced diameter bore 23 whereby an annular shoulder 24 is provided. As shown, the stem 11 is adapted to slide longitudinally in this bore and is provided at its lower end with an annular flange 25 having a diameter slightly less than the diameter of bore 22 whereby this flange may freely slide therewithin. Between the annular flange 25 and shoulder 24 there is provided a resilient means in the form of a coiled spring 26 held normally under compression. The lower tip end of the stem 11 is tapered and rounded very slightly as at 27 and adapted in normal vertical position to seat in a socket 28' formed by an annular raised lip 28 projecting up from the bottom of the chamber 20. This lip defines the entrance to a vertical passage 29 extending downwardly through the bottom of the central portion of the lower section 15 of the float.

With the above-described arrangement, it will be seen that the spring 26 tends to urge the ball 12 upwardly against its seat 21 and the stem 11 in an opposite direction into socket 28' formed in the raised annular lip 28.

The stem 11 is provided with a central bore 30, preferably tapered downwardly as shown. This bore 30, when the stem is in normal vertical position, as shown in Figure 2, is in coaxial alignment with the passage 29, and the bobber is therefore free to move along the fishing line 13.

In accordance with a feature of the present invention, the lower passage 29 is provided with a plurality of longitudinal slots 31 as clearly shown in Figure 5. These slots serve two functions; first, they provide a communication between the area outside the bottom of the bobber and the chamber 20 whereby water is free to enter the chamber even though the stem end 27 is seated in the socket portion 28' of lip 28, second, the slots serve as smooth guide grooves into any one of which the fishing line 13 may fit when the stem of the bobber is being tilted to a locked position. This second function will become clearer as the description proceeds.

In accordance with a further feature of the invention, the ball 12 is provided with a series of grooves 32 cut into its rounded surface as clearly shown in Figure 6. These grooves provide an ingress means to the chamber 20 from the area outside the top of the chamber. Thus, water may enter the chamber 20 from above, or air may escape through these grooves to permit entrance of water through the slots 31 from below. With the chamber 20 filled with water, the lower central portion of the bobber is weighted to provide increased stability as pointed out above.

Figure 4 illustrates the position of the bobber when locked to the line. As shown, a sudden jerk on the fishing line 13, laterally of the axis of the bobber, tilts the stem 11 relative to the toroidal member. Tilting of the stem causes the end portion 27 thereof to ride over the surface of the socket portion 28' of raised lip 28. The fishing line is thus "locked" between the stem and lip 28 and also between the stem and the bottom wall of the chamber 20, the coiled spring 26 pressing the stem toward this bottom wall to hold the line.

A pull on opposite ends of the line 13 will serve to release the bobber. After a fish has been hooked, for example, the fisherman may rapidly reel in the line or pull back on the pole whereby the ensuing tension in the line 13 will urge the stem 11 into its normal vertical position to re-align its bore 30 with the passage 29 in the lower section of the float. The bobber is then free to run along the line.

Because of the slotted structure 31 of the passage 29, the line will ride in one of these grooves when the stem is initially tilted, and the likelihood of the line binding on the lip 28 and rendering it difficult to tilt the stem, is materially reduced. Further as stated above, these slots 31 in cooperation with the grooves 32 in the ball 12 permit the chamber 20 to fill with water and suitably weight the lower central portion of the bobber.

Due to the fact that the center of gravity C of the water filling the chamber 20 is lower than the center of buoyancy B, and because of the flattened shape of the float body, there results an extremely stable bobber having little if any tendency to rotate about a horizontal axis when a jerk is applied to the line. The reliability of operation of the clutch mechanism is thus enormously increased.

In Figure 7 there is shown a modified type of bobber which is identical to that form shown in Fig. 1 except that the annular buoyant chamber in the bobber of Fig. 7 is enlarged in volume somewhat by squaring off the outer peripheral portion of the lower section, as shown at 33.

Modifications falling within the spirit and scope of the present invention will occur to those skilled in the art. The bobber is therefore not to be thought of as limited to the precise construction taken for purposes of illustration.

I claim:

1. A fishing bobber comprising: mating upper and lower sections each defining concave annular channels, said sections being affixed together to provide a buoyant body of toroidal shape defining an annular enclosure, the radius of the torus being greater than the maximum dimension of the torus in the direction of its axis whereby said bobber will float with said axis extending vertically, said lower section including a central depending wall portion defining with said torus a central chamber, said chamber being adapted to contain water when the bobber is floating, the center of gravity of water in the chamber when the torus is horizontal being lower than the center of buoyancy of said annular enclosure.

2. A bobber according to claim 1, in which said upper section includes an opening adjacent its center through which water may flow into said chamber to weight the lower center portion of said bobber.

3. A bobber according to claim 2 wherein said central depending wall portion includes a central passage extending therethrough from the lower end of said chamber and opening to the underside of the bobber through which a fishing line may pass, the wall of said passage having a plurality of longitudinal slots permitting water to flow into said chamber from below, air in said chamber passing out through said opening in said upper section.

4. A fishing bobber comprising: a hollow buoyant member of substantially toroidal shape having a diameter greater than the maximum dimension of the bobber in the direction of the axis of the toroid whereby the member is adapted to normally float with its toroidal axis vertical, said member including a central depending wall portion and the central portion of said member defining a chamber having said wall portion as its bottom, said member having an upper circular opening coaxial with the axis of the toroid and communicating with said chamber, a ball having a diameter greater than the diameter of said opening disposed within said chamber and a slidably seating against the edge of said openings, said ball having at least one groove cut in its surface to provide a flow space between said edge of the opening and the ball, a tubular stem slidably extending through a diametrical bore in said ball and adapted to occupy a normal position substantially coaxial with said toroidal axis, said wall portion including a central passage therethrough, an upwardly projecting annular lip on the inner surface of said wall portion about said passage and forming a socket for receiving the lower end of said tubular stem when the latter is in normal position, resilient means acting between said ball and stem and urging said ball upwardly against the edge of said opening and urging the stem downwardly into said socket, said stem and passage being adapted to have a fishing line extend therethrough, the arrangement and construction of parts being such that a sudden jerk on the line laterally of the stem acts to tilt said ball and stem whereby to cause said lower end of the stem to ride over said lip and bind the fishing line between the lower end of the stem and said lip.

5. A bobber according to claim 4 in which said chamber is adapted to contain water when the bobber is floating, the water in said chamber having a center of gravity lower than the center buoyancy of said member.

6. A bobber according to claim 5 in which the wall of said passage is formed with a series of longitudinally extending slots within any one of which said fishing line may ride.

7. A fishing bobber comprising: a hollow buoyant member forming a body of revolution about a given axis, the diameter of said member being greater than the maximum dimension of the bobber in the direction of said axis whereby said bobber is adapted to normally float with said axis vertical, the central portion of said member defining a chamber having a bottom wall portion, a movable member universally mounted within said chamber, a hollow tubular stem slidable in said movable member and provided with a bore extending therethrough, said movable member and stem being adapted for tilting movement relative to said buoyant member to position said stem coaxial with said axis of revolution, said bottom wall portion including a central passage extending therethrough which is positioned to be alined with the bore through said stem when the latter is in normal position, said bore and passage being adapted to have a fishing line extend therethrough, the arrangement being such that a sudden jerk on the fishing line transversely of the stem causes tilting of said movable member and stem to misaline said bore and passage and cause binding of the fishing line, and a pull on opposite ends of the fishing line acting to tilt said movable member and stem to normal position to aline said bore and passage and permit free movement of the bobber along the line.

8. A bobber according to claim 7 in which said chamber is adapted to contain water when the bobber is floating, the center of gravity of water in said chamber being lower than the center of buoyancy of said buoyant.

9. A fishing bobber comprising: a buoyant member formed with a central chamber having a bottom wall portion, said member including a circular opening communicating with said chamber, said bottom wall portion including a passage extending therethrough, an inner annular raised lip on the inner surface of said wall portion about the passage and forming a socket, a ball having a diameter greater than the diameter of said opening and located within said chamber and adapted to slidably seat against the edge of said opening, said ball having a diametrical bore and adapted to occupy a normal position wherein its bore is coaxial with said central passage, a tubular stem extending slidably through said bore and having its lower end seated in said socket when said ball is in normal position, resilient means acting between said ball and stem to urge the ball upwardly against said edge of the opening and the lower end of said stem into said socket, and said chamber being adapted to contain water when the bobber is floating, the center of gravity of water in said chamber being lower than the center of buoyancy of said bobber.

10. A bobber according to claim 9 in which said ball is slotted to provide a passage between the ball and said edge of the opening communicating with said chamber.

11. A bobber according to claim 9 in which the wall of said passage is formed with a plurality of longitudinally extending slots providing communication between said chamber and the underside of said bobber when the stem is seated in said socket.

12. A bobber according to claim 11 in which there is provided at least one passage between said ball and said edge of the opening communicating said chamber with the exterior of the bobber above the latter whereby water may enter said chamber through said slots and air may escape from said chamber through said last mentioned passage.

13. A bobber according to claim 12 in which said last mentioned passage is formed by a groove cut in the surface of said ball.

14. A fishing bobber comprising a buoyant float member having a given central axis which is vertical in normal floating position of the float, the maximum dimension of the float in the direction of said axis being substantially less than the transverse dimension of said float in a direction normal to said axis whereby said float possesses maximum buoyant stability, a tiltable hollow stem on the float and having a normal position coaxial with said axis, cooperating means on the float and stem providing a universal swivel connection between the float and stem for tilting of the latter relative to the float in any direction from said normal stem position, said float and stem having openings for receiving a fishing line, cooperating means on the stem and float for binding the bobber on the line when the stem is tilted from its normal position, said stem having a normally upper end above the float, the distance from the normally lowermost point of the float to said upper end of the stem when the latter is in normal position being substantially less than said transverse dimension of the float.

15. The subject matter of claim 14 wherein said float is toroidal shape and said axis is the axis of the toroid.

References Cited in the file of this patent
UNITED STATES PATENTS

| | | |
|---|---|---|
| 2,166,463 | Cressey | July 18, 1939 |
| 2,226,331 | Allison | Dec. 24, 1940 |
| 2,527,437 | Matras | Oct. 24, 1950 |
| 2,587,190 | Merriweather | Feb. 26, 1952 |
| 2,609,634 | Simpson | Sept. 9, 1952 |

FOREIGN PATENTS

| | | |
|---|---|---|
| 162,146 | Austria | Jan. 25, 1949 |